United States Patent [19]

Kimura et al.

[11] Patent Number: 4,841,116
[45] Date of Patent: Jun. 20, 1989

[54] PROCESS FOR AUTOMATIC FUSION WELDING OF RAILS

[75] Inventors: Akira Kimura; Hiroshi Kashiwabara; Hirohisa Fujiyama, all of Sagamihara, Japan

[73] Assignee: Nippon Steel Corporation, Tokyo, Japan

[21] Appl. No.: 159,254

[22] Filed: Feb. 23, 1988

[30] Foreign Application Priority Data

Feb. 24, 1987 [JP] Japan ................................. 62-40779

[51] Int. Cl.$^4$ ............................................. B23K 25/00
[52] U.S. Cl. ..................................... 219/73.1; 219/73
[58] Field of Search ................................. 219/73, 73.1

[56] References Cited

U.S. PATENT DOCUMENTS 4,413,169 11/1983 Cameron ............................ 219/73.1
4,575,606 3/1986 Safonnikov et al. ............... 219/73.1

FOREIGN PATENT DOCUMENTS 44-24249 10/1969 Japan .
45-12648 5/1970 Japan ................................. 219/73.1

*Primary Examiner*—Clifford C. Shaw

[57] ABSTRACT

A process for automatic fusion welding of rails by a combination of submerged arc welding and electroslag welding, comprising a root run for welding a rail base by submerged arc welding and, without interruption of the welding, subsequent runs for welding the rail base and welding a region from a rail web to a rail head by electroslag welding; wherein, during all of the runs, a metal mold is mounted on an upper surface of the rail base and a metal shoe is mounted on the metal mold to prevent an outflow of molten slag and molten metal and, during all of the runs, welding is performed by using a DC welding transformer having constant potential characterisitcs, a filler-wire having a diameter of from 1.2 to 2.0 mm, and a fused-type flux. The inventive process avoids the use of different fluxes and an alteration of welding machine conditions during the whole sequence of welding from the rail base through to the rail head.

1 Claim, 3 Drawing Sheets

PROCESS FOR AUTOMATIC FUSION WELDING OF RAILS

BACKGROUND OF THE INVENTION

1. Field of the Invention

The present invention relates to the automatic fusion welding of rails.

2. Description of the Related Art

The enclosed arc welding and thermit welding processes are widely employed for the field welding of rails, since they do not require that the rails be pressed together in the direction of the rail axis during welding. However, enclosed arc welding is not in automatic fusion welding process and, therefore, takes a long time, and the quality stability of the welded joint depends on the skill of the welding operater. The thermit welding is quicker when field welding rails. However, discontinuities or weld defects are likely to occur in the thermit-welded joints, the soundness of which also depends on the skill of the welding operator. To overcome these drawbacks, many processes of automatic fusion welding have been studied as an alternative process for welding rails, and a process was disclosed in Japanese Examined Patent Publication (Kokoku) No. 44-24249 as an alternative to enclosed arc welding and thermit welding. In this known process, the rail base is welded by submerged arc welding and the rail web, head and other portions are welded by electroslag welding.

The known process has advantages in that it does not require that the rails be pressed together in the direction of the rail axis, because it is a fusion welding process, and in that an improved efficiency is expected in comparison with the enclosed arc welding. However, several problems still remain, as follows.

In the known process, the slag formed during the submerged arc welding must be removed at the completion of each welding run. Moreover, when welding of the rail base is completed, the welding is interrupted and then the electroslag welding is carried out to weld the rail web and head. This causes a lack of fusion, hot cracks, and other weld defects upon the initiation and the termination of each run of welding, which lead to an impairment of the process efficiency. Further disadvantages arise in that different fluxes, varied welding machine conditions, etc., are required for welding the rail base and for welding the rail web and head, and these operational complexities will result in a lowered efficiency, the need for expensive welding equipment, and a complex management of consumable materials.

SUMMARY OF THE INVENTION

The object of the present invention is to solve the above-described problems.

This object is achieved, according to the present invention, by a process for automatic fusion welding of rails by a combination of submerged arc welding and electroslag welding, comprising a root run for welding a rail base by submerged arc welding and, without interruption of said welding, subsequent runs for welding the rail base and welding a region from a rail web to a rail head by electroslag welding; wherein, during all of said runs, a metal mold is mounted on an upper surface of the rail base and a metal shoe is mounted on the metal mold to prevent an outflow of molten slag and molten metal and, during all of said runs, welding is performed by using a DC welding transformer having constant potential characteristics, a filler-wire having a diameter of from 1.2 to 2.0 mm, and a fused-type flux.

In the process according to the present invention, the fused-type flux preferably contains, as the main components, at least $CaF_2$ and $TiO_2$ in amounts of from 15 to 45% and from 15 to 35%, respectively, the total amount of $CaF_2$ and $TiO_2$ being 50% or more.

DESCRIPTION OF THE PREFERRED EMBODIMENT

Figure 1:
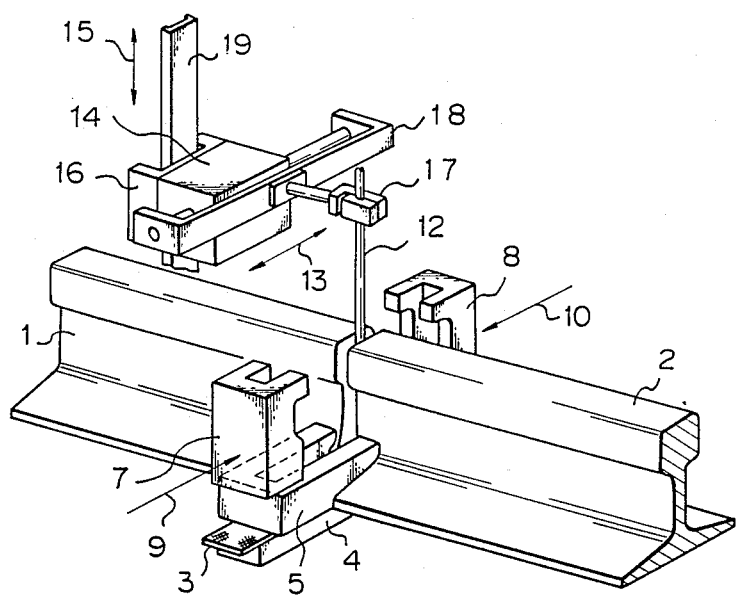
FIG. 1 is a perspective view showing a preferred embodiment of the present invention.
Figure 2:
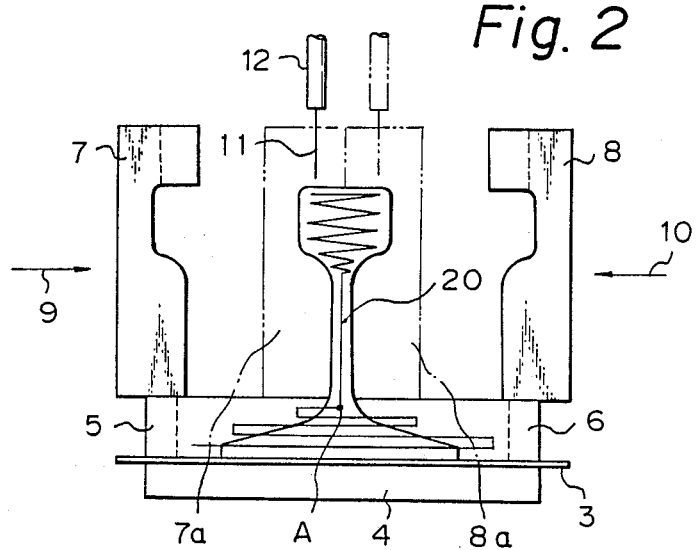
FIG. 2 is a side view of the embodiment shown in FIG. 1.

Referring to FIGS. 1 and 2, rails 1 and 2, the members to be welded, are placed so that a suitable gap is set between the ends of these two rails. A backing 3 is pressed against the back of the rail base and co-operates with a copper plate 4 in the forming of a root bead. A pair of copper molds 5 and 6 are mounted on the upper surface of the rail base at both sides of the rails 1 and 2, respectively, to enclose the welding groove defined by the rail edges and thereby prevent molten metal from flowing out of the groove. Copper shoes 7 and 8 for welding the rail web and head are mounted on the top surfaces of the copper molds 5 and 6 and can be slidably moved, as welding proceeds, in the directions of the arrows 9 and 10 by a driving means (not shown) such as a motor, a hydraulic drive mechanism, or the like. A guide tube 12 guides a filler wire 11 into the groove and feeds power from a welding transformer to the filler wire 11. The guide tube 12 is held by a horizontal travelling member 14 and a fixture 16 through a holder 17 and a connecting plate 18. The horizontal travelling member 14 travels along a horizontal axis as shown by an arrow 13, and the fixture 16 moves vertically as shown by an arrow 15. A guide rail 19 guides the fixture 16. Welding proceeds is such a way that the tip of the filler wire 11 runs along a trace 20 as shown in FIG. 2. When and after the tip enters the rail web region, i.e., passes a point "A" of the trace 20, the copper shoes 7 and 8 are positioned as shown by 7a and 8a, respectively.

Figure 3:
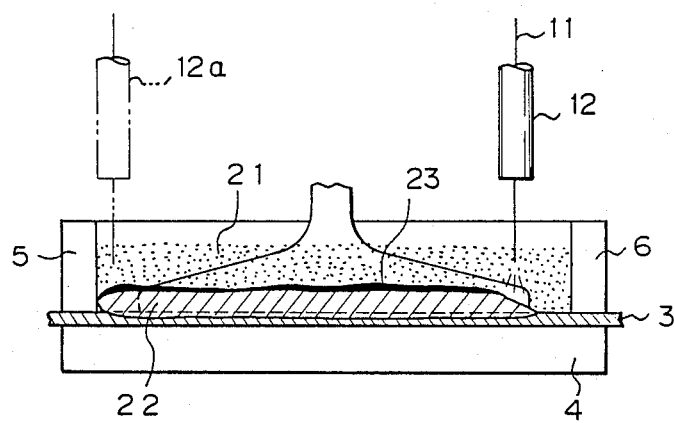
FIG. 3 is a cross sectional view showing the first run of welding of the rail base according to the present invention.
Figure 4:
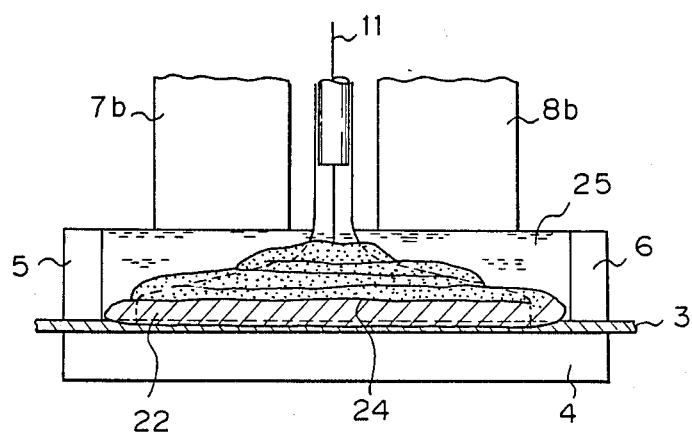
FIG. 4 is a cross sectional view showing the second and subsequent runs of welding of the rail base according to the present invention; and, FIG. 5 is a cross sectional view showing operations during the welding of the rail web and head according to the present invention.
Figure 5:
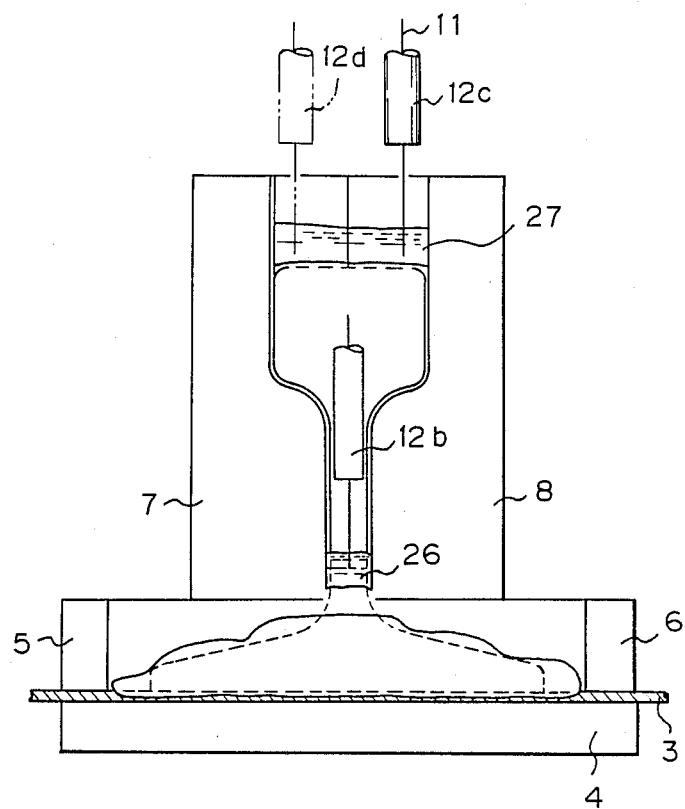

Referring to FIGS. 3 to 5, a process according to the present invention will be described in more detail together with the welding sequence.

FIG. 3 schematically shows a root welding at the rail base. Numeral 21 denotes a fused-type flux, 22 a solidified root bead, and 23 a slag covering the bead 22. Welding proceeds as the guide tube 12 moves from a position 12a to the right in the Figure. The flux 21 is scattered within the copper molds 5 and 6 so that it covers the groove to protect the welding arc against air and to be partially melted to form a slag which covers a molten pool and the vicinity thereof. As welding proceeds, the backing 3 is also partially melted to cover the back side of the bead 22 with a thin layer of slag and form a smooth bead. In the submerged arc welding for welding of the root run, fused-type flux is suitably used to ensure a stable welding during the subsequent electroslag welding of the sequent runs even when a molten slag bath is shallow and also most suitably a backing 3 of laminated glass tapes with a backup support of copper plate 4 is used to prevent an excess reinforcement of the root bead at the base side even when the groove has an "I"-shape and a relatively large root gap of 12 to 20 mm.

FIG. 4 is a schematic view of the welding of the second and the subsequent runs at the rail base. Welding is performed by electroslag welding. FIG. 4 depicts a stage of the welding sequence near completion when welding of the rail base has proceeded to the fifth run. FIG. 4 includes beads 24 of the second and the subsequent runs a slag bath 25, and copper shoes 7b and 8b used for welding the rail web and head, respectively.

Welding of the second run is performed after the welding of the root run described above by moving the guide tube in the reverse direction without interrupting welding. In the welding of the second run, if the guide tube 12 travels at the same speed as used during the welding of the root run, a solidified slag 23 cannot be remelted, which causes an unstable welding arc and, in turn, welding per se. To avoid this problem, the guide tube 12 travels at a speed 30 to 70% lower than that used for welding of the root run, with the result that the solidified slag 23 is remelted and the non-molten part of the flux 21 scattered during welding of the root run is also melted to form a slag, which both lead to the formation of a slag for electroslag welding. Welding of the rail base is thus shifted from the submerged arc welding to the electroslag welding when welding of the second run starts, and welding proceeds to weld the subsequent runs by a repeated, reciprocal travelling of the guide tube 12. The stroke of the horizontal travel of the guide tube 12 is preferably stepped down at each half of one reciprocation cycle to prevent a formation of an excess reinforcement of the weld and reduce the welding finishing work. The copper shoes 7 and 8 are brought close to the rail web step by step as the stroke of the guide tube 12 is stepped down and are positioned at the vicinity of the rail base, as shown by 7b and 8b in FIG. 4, when welding of the rail base is almost completed, to stand by for a quick shift of the welding from the rail base to the rail web.

Welding of the rail web and head will be described with reference to FIG. 5. FIG. 5 shows a guide tube position 12b and a molten slag bath 26 during welding of the rail web, as well as guide tube positions 12c and 12d and a molten slag bath 27 during welding of the rail head. Welding of the rail head is performed by a repeated, reciprocal travelling of the guide tube within the region between the positions 12c and 12d, as shown in the figure. The copper shoes 7 and 8 are pressed against the rail and are in close contact therewith to prevent a flow out of the slag 26 or 27 and adjust the bead shape.

After the electroslag welding of the rail base a described with reference to FIG. 4, the horizontal travel of the guide tube 12 is stopped midway in the rail width and then the electroslag welding of the rail web is performed by moving the guide tube 12 only upward. When the welding of the rail web is completed and the guide tube 12 enters the rail head region, the reciprocal, horizontal travel of the guide tube 12 is restarted and the stroke of the reciprocal, horizontal travel is gradually substantially increased up to the entire width of the rail head, with the result that welding is performed by a reciprocal, horizontal travel of the guide tube between the positions 12c and 12d. As the electroslag welding proceeds from the rail base to the rail head, flux is fed to make up for the decrease of the slag bath depth.

In the present invention, the following welding conditions for the filler wire size, the welding transformer, the flux type, etc., are suitable from the viewpoints of welding workability and weld performance.

A filler-wire is suitable to shift welding continuously from the submerged arc welding to the electroslag welding without changing the flux and removal of the slag, since such wires are easily melted even when the slag bath depth is small, such as during the welding of the rail base. The optimum filler wire diameter ranges from 1.2 to 2.0 mm. A wire diameter less than 1.2 mm results in a poor arc force and a small arc spread and, therefore, cannot provide a preferable root bead. A wire having a diameter exceeding 2.0 mm is not easily melted in a shallow slag bath.

A DC welding transformer having constant potential characteristics is suitably used with a constant wire feed rate to successfully perform the submerged arc welding and the electroslag welding with a filler wire.

Fused-type flux is suitable for providing a good workability in both the submerged arc welding and the electroslag welding.

The present inventors have found that the fused-type flux preferably contains, as main components, at least $CaF_2$ and $TiO_2$. When a fused-type flux containing these components as main components is used, the amount of $CaF_2$ and the amount of $TiO_2$ in the flux is suitably within the ranges of from 15 to 45% and from 15 to 35%, respectively, the total amount of $CaF_2$ and $TiO_2$ being 50% or more. An amount of $CaF_2$ less than 15% results in an unsuccessful welding shift from the submerged arc welding to the electroslag welding. An amount of $CaF_2$ of more than 45% causes a pollution of the work environment due to the emission of fluoride gases. The component $TiO_2$ is used in combination with the component $CaF_2$ to ensure that the electric conductivity of the slag is at a suitable value during the electroslag welding. An amount of $TiO_2$ of less than 15% cannot provide this effect. An amount of $TiO_2$ of more than 35% results in an elevation of the melting point of the slag and welding cannot be successfully shifted from the submerged arc welding to the electroslag welding. The total amount of $CaF_2$ and $TiO_2$ contained as main components in the flux is suitably 50% or more, to ensure a successful welding shift from the submerged arc welding to the electroslag welding and a good welding workability.

Examples according to the present invention, and comparative examples, will be described below.

EXAMPLE 1

A 132 lb-rail for railroad used was butt-welded in the constitution and process sequence according to the present invention.

The welding materials used are as follows:
Filler wire: 1.6 mm-diameter solid wire,
Flux: fused-type flux, $CaF_2$ 35%—$TiO_2$ 30%—CaO 20%—$SiO_2$ 15%,
Backing: four 1.0 mm-thick glass tapes laminated,
Welding transformer: constant potential characteristics, DC transformer with 500 A rated current.
The welding condition is shown in Table 1.

EXAMPLE 2

A 132 lb-rail for railroad use was butt-welded in the constitution and process sequence according to the present invention.

The welding materials used are as follows:
Filler wire: 1.6 mm-diameter solid wire,
Flux: fused-type flux, $CaF_2$ 31%—$TiO_2$ 28%—CaO 17%—$SiO_2$ 22%—MgO 2%,
Backing: four 1.0 mm-thick glass tapes laminated plus block,
Welding transformer: constant potential characteristics, DC transformer with 500 A rated current.
The welding condition is shown in Table 2.

EXAMPLE 3

A 132 lb-rail for railroad used was butt-welded in the constitution and process sequence according to the present invention.

The welding materials used are as follows:
Filler wire: 1.2 mm-diameter solid wire,
Flux: fused-type flux, $CaF_2$ 40%—$TiO_2$ 20% - CaO 15%—$SiO_2$ 19%—$Al_2O_3$ 6%,
Backing: four 1.0 mm-thick glass tapes laminated,
Welding transformer: constant potential characteristics, DC transformer with 500 A rated current.
The welding condition is shown in Table 3.

EXAMPLE 4

A 132 lb-rail for railroad use was butt-welded in the constitution and process sequence according to the present invention.

The welding materials used are as follows:
Filler wire: 2.0 mm-diameter solid wire,
Flux: fused-type flux, $CaF_2$ 25%—$TiO_2$ 25%—CaO 18%—$SiO_2$ 20%—MgO 5%—$ZrO_2$ 7%,
Backing: 1.0 mm-thick glass tape plus block,
Welding tranformer: constant potential characteristics, DC transformer with 600 A rated current.
The welding condition is shown in Table 4.

In the Examples 1 to 4 according to the present invention, welding took about 14 min except for the necessary preparation and after-treatment and a high work efficiency was achieved without weld defects.

COMPARATIVE EXAMPLE 1

A 132 lb-rail for railroad use was butt-welded in the constitution below.

The welding materials used are as follows:
Filler wire: 3.2 mm-diameter solid wire,
Flux: fused-type flux, $CaF_2$ 25%—$TiO_2$ 27%—CaO 16%—$SiO_2$ 28%—MgO 45,
Backing: four 1.0 mm-thick glass tapes laminated,
Welding transformer: constant potential characteristics, DC transformer with 600 A rated current.
The welding condition is shown in Table 5.

Welding after the second run of the rail base could not be performed, because the filler diameter exceeded the specified range of the present invention, with the result that a good electroslag welding was not maintained.

COMPARATIVE EXAMPLE 2

A 132 lb-rail for railroad use was butt-welded in the constitution below.

The welding materials used are as follows:
Filler wire: 1.6 mm-diameter solid wire,
Flux: bond type flux, $CaF_2$ 14%—$TiO_2$ 20%— CaO 5%—$SiO_2$ 25%—$Al_2O_3$ 36%,
Backing: four 1.0 mm-thick glass tapes laminated,
Welding transformer: constant potential characteristics, DC transformer with 500 A rated current.
The welding condition is shown in Table 6.

Welding after the second run could not be performed, because the flux type used was unsuitable with the result that welding was not successfully shifted from the submerged arc welding to the electroslag welding.

TABLE 1

| Position | Welding Current (A) | Welding Voltage (V) | Welding Speed (cm/min) Upward Movement | Welding Speed (cm/min) Horizontal Travel |
| --- | --- | --- | --- | --- |
| Base | | | | |
| Root Run | 450 | 47 | — | 30 |
| 2nd to 5th Run | 400 | 40 | — | 20 |
| Web | 380 | 36 | 6.0 | — |
| Head | 380 | 36 | 1.5 | 120 |

(Root gap = 17 mm)

TABLE 2

| Position | Welding Current (A) | Welding Voltage (V) | Welding Speed (cm/min) Upward Movement | Welding Speed (cm/min) Horizontal Travel |
| --- | --- | --- | --- | --- |
| Base | | | | |
| Root Run | 450 | 48 | — | 20 |
| 2nd Run | 400 | 38 | — | 8 |
| 3rd to 7th Run | 380 | 36 | — | 20 |
| Web | 380 | 36 | 6.0 | — |
| Head | 380 | 36 | 1.5 | 24 |

(Root gap = 17 mm)

TABLE 3

| Position | Welding Current (A) | Welding Voltage (V) | Welding Speed (cm/min) Upward Movement | Welding Speed (cm/min) Horizontal Travel |
| --- | --- | --- | --- | --- |
| Base | | | | |
| Root Run | 400 | 45 | — | 17 |
| 2nd Run | 350 | 35 | — | 5 |
| 3rd to 6th Run | 350 | 35 | — | 15 |
| Web | 350 | 35 | 4.0 | — |
| Head | 350 | 35 | 1.0 | 30 |

(Root gap = 17 mm)

TABLE 4

| Position | Welding Current (A) | Welding Voltage (V) | Welding Speed (cm/min) Upward Movement | Welding Speed (cm/min) Horizontal Travel |
| --- | --- | --- | --- | --- |
| Base | | | | |
| Root Run | 520 | 50 | — | 25 |
| 2nd Run | 450 | 42 | — | 10 |
| 3rd to 5th Run | 420 | 40 | — | 25 |
| Web | 420 | 40 | 7.0 | — |
| Head | 420 | 40 | 2.0 | 25 |

(Root gap = 17 mm)

TABLE 5

| Position | Welding Current (A) | Welding Voltage (V) | Welding Speed (cm/min) | |
| --- | --- | --- | --- | --- |
| | | | Upward Movement | Horizontal Travel |
| Base | | | | |
| Root Run | 500 | 45 | — | 30 |
| 2nd Run | 450 | 40 | — | 12 |
| 3rd Run | further welding impossible | | | |
| Web | | | — | |
| Head | | | — | |

(Root gap = 17 mm)

TABLE 6

| Position | Welding Current (A) | Welding Voltage (V) | Welding Speed (cm/min) | |
| --- | --- | --- | --- | --- |
| | | | Upward Movement | Horizontal Travel |
| Base | | | | |
| Root Run | 450 | 47 | — | 30 |
| 2nd Run | 400 | 40 | — | 20 |
| 3rd Run | further welding impossible | | | |
| Web | | | — | |
| Head | | | — | |

(Root gap = 17 mm)

As described hereinabove, the present invention realized an automatic fusion welding of rails, particularly in field welding, at a high efficiency through a combination of submerged arc welding and electroslag welding for welding the rail base through the rail head without a complicated shift in the welding transformer operation and without changing the welding materials.

We claim:

1. A process for automatic fusion welding of rails by a combination of submerged arc welding and electroslag welding, said rails having a base, a web, and a head, said process comprising:

performing an initial root weld run on the rail base using submerged arc welding and thereafter, without interruption of welding, performing subsequent weld runs on the rail base, followed by the rail web, and then the rail head using electroslag welding until completion of welding;

during all of said welding runs, preventing outflow of molten slag and molten metal by providing a metal mold mounted on an upper surface of the rail base and a metal shoe mounted on the metal mold;

performing all of said welding runs by using a DC welding power source providing a DC current and having constant potential characteristics, by using a filler wire having a diameter of form 1.2 to 2.0 mm, and by using a fused type flux comprising, as a main component, at least 15 to 45% of $CaF_2$ and 15 to 35% of $TiO_2$, wherein the total amount of $CaF_2$ and $TiO_2$ is at least 50%.

* * * * *

UNITED STATES PATENT AND TRADEMARK OFFICE
CERTIFICATE OF CORRECTION

PATENT NO. : 4,841,116

DATED : June 20, 1989

INVENTOR(S) : A. Kimura, et al.

It is certified that error appears in the above-identified patent and that said Letters Patent is hereby corrected as shown below:

ABSTRACT, line 13, change "characterisitics" to --characteristics--.

Column 1, line 14, change "in" to --an--.

Column 3, line 4, change "sequent" to --subsequent--.

Column 3, line 60, change "a" to --as--.

Column 4, line 58, change "used" to --use--.

Column 5, line 53, change "45" to --4%--.

Column 8, line 24, change "form" to --from--.

Signed and Sealed this

Sixth Day of March, 1990

Attest:

JEFFREY M. SAMUELS

*Attesting Officer*  *Acting Commissioner of Patents and Trademarks*